Patented Sept. 22, 1931

1,824,426

UNITED STATES PATENT OFFICE

EMIL C. FANTO, OF FAIRFIELD, CONNECTICUT, ASSIGNOR TO McKESSON & ROBBINS, INC., OF BRIDGEPORT, CONNECTICUT, A CORPORATION OF CONNECTICUT

NORMAL HEPTYL PHENOL

No Drawing.    Application filed April 24, 1929.   Serial No. 357,885.

The present invention relates to a new product, normal heptyl phenol, and to a method of making same. The invention will be best understood by reference to the following example, illustrative of the method.

1000 lbs. of castor oil are placed in a vacuum still provided with a stirrer and subjected to a destructive distillation under reduced pressure of 30 to 40 mm. mercury. Distillation is continued until distillate is no longer collected at a temperature varying from 270–300° C. The crude distillate so collected is placed in preferably an enamelled still having a fractionating column and the fraction distilling over between 147–165° C. collected. This fraction weighs approximately 100 lbs. The next step is to reduce this material, and to accomplish this, the distillate obtained is mixed with iron turnings and diluted acetic acid, 1—1, and placed in a steam-jacketed still having a mechanical stirrer and reflux condenser. The still is then heated by steam and the reduction accompanied by agitation is continued for six to seven hours. This reduction is of the general type

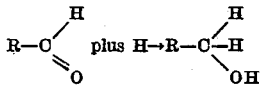

where R is an alkyl group. Any set of reducing agents which will furnish a convenient supply of H may be used such as iron or zinc with diluted acids. The mixture is then allowed to settle and the oily layer siphoned off, washed twice with hot 10% sodium hydroxide solution, and then several times with hot water until it is free from alkali. The water is then separated and the oil filtered over a bed of fused sodium sulphate. The dried filtrate is then distilled in a vacuum still and the fraction collected which passes over at a temperature range of 67–71° C. at 9 mm.

The now purified distillate consisting of normal heptyl alcohol is combined with phenol and for this purpose is passed to an autoclave-still provided with a reflux condenser and a strong mechanical agitator. Here it is heated to boiling for four hours with an equal amount of phenol and two to three times its weight fused zinc chlorid. After cooling the reaction mixture to about 100° C., the same is twice washed with dilute hydrochloric acid and three times with pure water. The washed phenol mixture is fractionally distilled under vacuum and the fraction distilling between 124–137° C. at 8 mm. pressure is separately collected and consists of 100 pounds crude normal heptyl phenol which by repeated redistillation is obtained in a pure state. This is a colorless, oily liquid of pleasant, aromatic odor and has valuable germicidal and therapeutic properties. The reaction between the normal heptyl alcohol and the phenol is represented by the following equation:

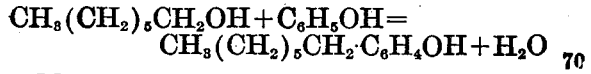

My improved compound may be used either internally or externally as an antiseptic and disinfectant either in the pure state or compounded in any suitable manner.

I claim:

1. As a new product, normal heptyl phenol.
2. The method of separating normal heptyl phenol from a mixture obtained by condensing normal heptyl alcohol with phenol in the presence of a condensing agent, comprising the steps of fractionally distilling the mixture under reduced pressure, and recovering the normal heptyl phenol.
3. The method of separating normal heptyl phenol from a mixture obtained by condensing normal heptyl alcohol with phenol in the presence of a condensing agent, comprising the steps of fractionally distilling the mixture under reduced pressure of substantially 8 mm., and recovering the normal heptyl phenol.
4. The method of separating normal heptyl phenol from a mixture obtained by condensing normal heptyl alcohol with phenol in the presence of a condensing agent, comprising the steps of fractionally distilling the mixture under reduced pressure of substantially 8 mm. and recovering the fraction distilling substantially between 124–137° C.

5. The method of separating normal heptyl phenol from a mixture obtained by condensing normal heptyl alcohol with phenol in the presence of a condensing agent comprising the steps of fractionally distilling the mixture under reduced pressure, recovering the normal heptyl phenol, and purifying the same by repeated redistillation.

6. The method of separating normal heptyl phenol from a mixture obtained by condensing normal heptyl alcohol with phenol in the presence of a condensing agent, comprising the steps of fractionally distilling the mixture under reduced pressure of substantially 8 mm. recovering the fraction distilling between 124–137° C., and purifying the same by repeated redistillation.

In testimony whereof I have affixed my signature to this specification.

EMIL C. FANTO.